(12) United States Patent
Martineau et al.

(10) Patent No.: US 6,377,434 B1
(45) Date of Patent: Apr. 23, 2002

(54) INDIVIDUAL SECONDARY PROTECTION DEVICE

(75) Inventors: David Eugene Martineau, Wayne; Peter J. Massa, Leonia, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/418,088

(22) Filed: Oct. 14, 1999

(51) Int. Cl.[7] ................................................ H01C 7/12
(52) U.S. Cl. ...................... 361/119; 361/91.5; 361/106
(58) Field of Search ....................... 361/54–56, 104–108, 361/90, 91.1, 110, 111, 115, 118–120, 58, 91.5, 117, 124–127, 91.6

(56) References Cited

U.S. PATENT DOCUMENTS

| | | | | |
|---|---|---|---|---|
| 4,282,555 A | * | 8/1981 | Svedberg | 361/56 |
| 4,500,754 A | * | 2/1985 | Mackey | 179/81 |
| 4,586,104 A | * | 4/1986 | Standler | 361/91 |
| 4,602,308 A | * | 7/1986 | Montague | 361/91 |
| 5,493,469 A | * | 2/1996 | Lace | 361/119 |
| 5,790,363 A | * | 8/1998 | Chaudhry | 361/119 |
| 6,031,706 A | * | 2/2000 | Nabell | 361/111 |
| 6,040,972 A | * | 3/2000 | Takeuchi | 361/119 |
| 6,195,245 B1 | * | 2/2001 | Kobsa | 361/120 |

* cited by examiner

*Primary Examiner*—Michael J. Sherry
(74) *Attorney, Agent, or Firm*—Ratner & Prestia

(57) ABSTRACT

A secondary protection device for protecting a circuit. The device includes a first positive temperature coefficient (PTC) resistor, a bidirectional zener diode and a second PTC resistor connected in series across input terminals. Output terminals are connected across the bidirectional zener diode for providing a protected output to the circuit. A second zener diode is coupled between one end of the bidirectional zener diode and a ground potential for limiting an output voltage to the circuit.

16 Claims, 2 Drawing Sheets

INDIVIDUAL SECONDARY PROTECTION DEVICE

TECHNICAL FIELD

The present invention relates, in general, to surge protection devices and, more specifically to secondary protection devices for protecting circuitry operating with low level voltages.

BACKGROUND OF THE INVENTION

Bipolar circuitry may be exposed to damaging surges from the outside environment. Typically, the circuitry may be protected with a primary protector and a secondary protector. The primary protector is generally used to protect circuits operating with high level voltages, and the secondary protector is used to protect circuits operating with low level voltages, such as TTL logic level voltages.

Secondary protection devices must be fast acting to protect circuits against surges due to lightning or cross voltage appearing at the input terminals to the circuits. Some circuits, such as telephone communication (T1/E1) circuits, are also exposed to potentially destructive DC bias voltages and need isolation from the DC bias to prevent damage.

As new communication systems are introduced, secondary protection is provided by designing a protector circuit custom made for the system to be protected. Typically, the protector circuit may be part of other functional circuits in the system. Because the protector circuit is typically placed on the same chip as other functional circuits, precious space on the chip is allocated to the protector circuit. This approach is expensive and time consuming.

A need exists, therefore, for a secondary protection device that may be separate from the circuits to be protected. A need also exists for a secondary protection device that may be used for protecting various low level voltage circuits without having to custom design the protector circuit for each low level voltage circuit. Furthermore, a need exists for a protection device that may protect a circuit quickly and reliably.

SUMMARY OF THE INVENTION

To meet this and other needs, and in view of its purposes, the present invention provides a secondary protection device for protecting a circuit, including a first positive temperature coefficient (PTC) resistor, a bidirectional zener diode and a second PTC resistor connected in series across input terminals. The output terminals are connected across the bidirectional zener diode for providing a protected output to the circuit. A second zener diode is coupled between one end of the bidirectional zener diode and a ground potential for limiting an output voltage to the circuit. The diode power capabilities are based upon the protection requirements of the circuit. The PTC resistors each have a value of 4–6 ohms nominally. The secondary protection device is modularized and individually inserted in a punch down, 110-type connecting block for protecting the circuit.

In another embodiment, the secondary protection device includes a first positive temperature coefficient (PTC) resistor, a fast switching diode bridge and a second PTC resistor connected in series across input terminals. A first zener diode is connected between first and second nodes of the fast switching diode bridge. Second and third zener diodes are each connected between the first and second nodes respectively and a ground potential. Output terminals are connected between a third node of the diode bridge and the ground potential for providing a protected output to the circuit.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
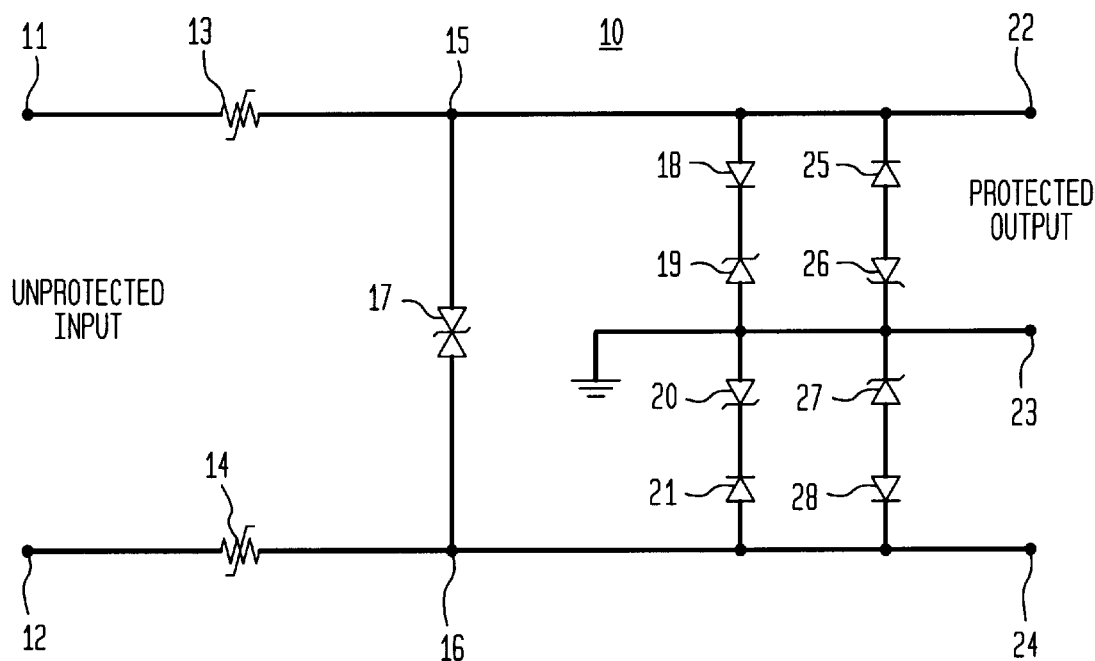
FIG. 1 is a circuit diagram of a secondary protection device in accordance with one embodiment of the present invention.

Referring now to the drawings, and more particularly to FIG. 1, there is shown a secondary protection device, generally designated 10. Input terminals 11 and 12 provide a connection for receiving an unprotected signal, and output terminals 22 and 24 may provide a connection to a circuit being protected. For example, input terminals 11 and 12 may be connected to a TTL receiver that places a 5 volt level digital signal onto terminals 11 and 12. Connected in parallel with terminals 11 and 12 are positive temperature coefficient (PTC) resistors 13 and 14 and bidirectional zener diode 17. Bidirectional zener diode 17 is connected to PTC 13 and 14 at nodes 15 and 16, respectively.

For the embodiment shown in FIG. 1, PTC 13 and 14 are each 4–6 ohm PTC resistors. Due to PTC 13 and 14 being able to change resistance as a function of temperature, PTC 13 and 14 each absorb high current for durations less than 1 millisecond and protect against AC line voltages at terminals 11 and 12 as high as 600 VAC, 47 Hz to 63 Hz. Bidirectional zener diode 17, which is also a 5 volt component, conducts high current differentially. In operation, when the voltage across nodes 15 and 16 exceeds 5 volts, zener diode 17 begins to conduct. When the voltage across nodes 15 and 16 exceeds 7 volts, zener diode 17 is fully "on". In this manner, bidirectional zener diode 17 clamps the differential voltage across nodes 15 and 16 to less than 7 volts. It will be appreciated that zener diode 17 turns "on" in less than 50 nanoseconds.

Connected between node 15 and ground potential are diode 18 and zener diode 19. Similarly, connected between node 16 and ground potential are diode 21 and zener diode 20. Zener diodes 19 and 20 are each 5 volt zener diodes in the example shown in FIG. 1. Diodes 18 and 21 may be omitted, if switching times of 50 nanoseconds are sufficient for protection. Diodes 18 and 21 may be added, as shown, to decrease the switching times. For example, diodes 18 and 21 each have a capacitance of 10 picofarads or less and turn on in less than 5 nanoseconds. Thus, diodes 18 and 19 clamp the voltage at output terminal 22 to less than 7 volts with respect to ground potential at node 23 and, similarly, diodes 20 and 21 clamp the voltage at output terminal 24 to less than 7 volts with respect to ground. Diodes 25–28 provide a function similar to diodes 18–21, except they clamp negative voltages; diodes 18–21 clamp positive voltages.

In the embodiment shown in FIG. 1, the line-to-line voltage between output terminals 22 and 24 is protected to less than 7 volts, and the line-to-ground voltage between respective terminals 22–23 and terminals 23–24 is protected to less than 7 volts.

Figure 2:
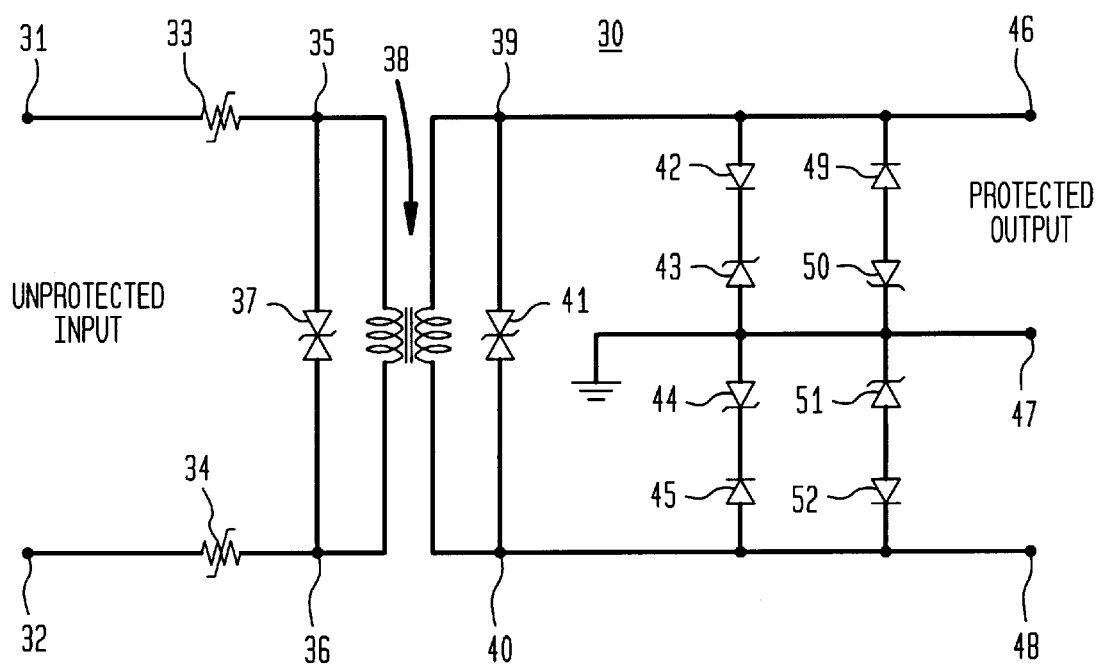
FIG. 2 is a circuit diagram of a secondary protection device, with isolation, in accordance with another embodiment of the present invention.

Another embodiment of a secondary protection device is shown in FIG. 2 and is generally designated as 30. In this embodiment, the circuit (not shown) connected at output terminals 46 and 48, for example, is provided with a T1/E1 signal from input terminals 31 and 32. As known to those skilled in the art, various T1/E1 systems may be used in communications to remove a DC bias of −48 volts or −130 volts, for example, from the T1/E1 signal. In the example shown in FIG. 2, T1/E1 transformer 38 may be used to remove the DC bias between the input terminals and output terminals. As known to those skilled in the art, a T1 refers to a transmission link having a capacity of 1.544 megabits per second and an E1 refers to a transmission link having a capacity of 2.048 megabits per second.

Shown added on the primary side of T1/E1 transformer 38 are PTC resistors 33 and 34 and bidirectional zener diode 37. Bidirectional zener diode 37 is connected in parallel to the primary side of T1/E1 transformer 38 at nodes 35 and 36. A second bidirectional zener diode 41 is connected to the secondary side of T1/E1 transformer 38 at nodes 39 and 40. The T1/E1 transformer has a 1:1 (one to one) turns ratio but other transformer ratios may be used depending upon the application.

In operation, PTC 33 and PTC 34 absorb any high current present at the input terminals for durations of 1 millisecond or less and protect against continuous AC line voltages of 600 VAC, 47 Hz to 63 Hz. Bidirectional zener diode 37 conducts the high current differentially across the primary side of the transformer and thus protects the input side to less than 7 volts. The second bidirectional zener diode 41 operates in a manner similar to bidirectional zener diode 37 and protects the secondary side of the transformer, as it conducts current differentially between nodes 39 and 40. Both diodes 37 and 41 turn on completely with a differential voltage that is greater than 7 volts. The turn on speed is less than 50 nanoseconds. Diode 41 is optional and may be omitted.

Similar to the embodiment described before, secondary protection device 30 includes diode 42 and zener diode 43 connected between output terminal 46 and node 47. Node 47 is at ground potential. In addition, diode 45 and zener diode 44 are connected between output terminal 48 and node 47. Zener diodes 43 and 44 are 5 volt zeners and conduct current to ground, thereby protecting output terminals 46 and 48. Diodes 42 and 45 may be omitted from secondary protection device 30.

Diodes 42 and 45 may be added, if zeners 43 and 44 have large capacitances (greater than 7200 picofarads). By including diodes 42 and 45 in the device, the overall capacitance between each output terminal (46 or 48) and ground node 47 is lowered to a value under 10 picofarads. This provides a switching time that is less than 50 nanoseconds. Diodes 49–52 provide a function similar to diodes 42–45, except they clamp negative voltages; diodes 4245 clamp positive voltages.

In the embodiment shown in FIG. 2, the line-to-line voltage between output terminals 46 and 48 is protected to less than 7 volts and the line-to-ground voltage from terminal 46 and terminal 48, respectively, to ground node 47 is protected to less than 7 volts.

Figure 3:
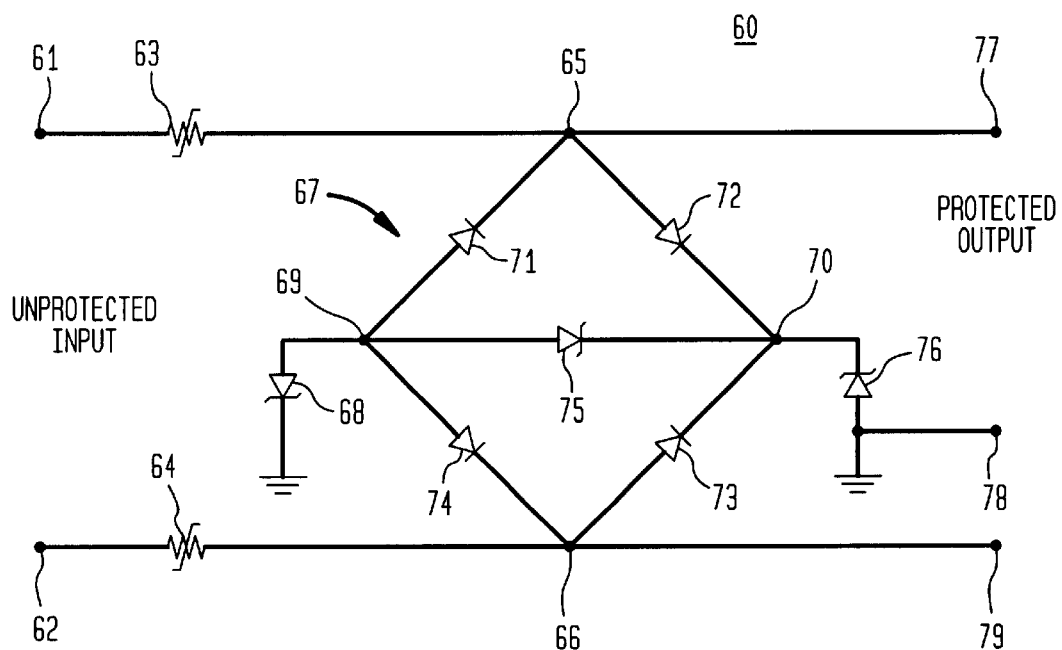
FIG. 3 is a circuit diagram of a secondary protection device in accordance with yet another embodiment of the present invention.

Still another embodiment of a secondary protection device is shown in FIG. 3 and is generally designated as 60. The circuit to be protected is connected at terminals 77 and 79 for receiving TTL data from input terminals 61 and 62. Connected across the input terminals are PTC resistors 63 and 64 and diode bridge 67. Diode bridge 67, which includes four fast switching diodes 71, 72, 73 and 74, is shown connected across nodes 65 and 66. Completing FIG. 3 are zener diodes 68, 75 and 76 connected respectively to nodes 69 and 70.

It will be appreciated that PTC 63 and PTC 64 may be 4–6 ohm resistors. The zener diodes may each be 5 volt zeners. Thus, secondary protecting device 60 effectively conducts high current and voltage on input terminals 61 and 62 away from the circuit being protected (not shown). Zener diode 75 conducts differentially across diode bridge 67. Zener diodes 68 and 76 conduct current to ground at node 78. Diode 68 conducts negative current to ground and diode 76 conducts positive current to ground. Diode 75 is optional and may be omitted.

Figure 4:
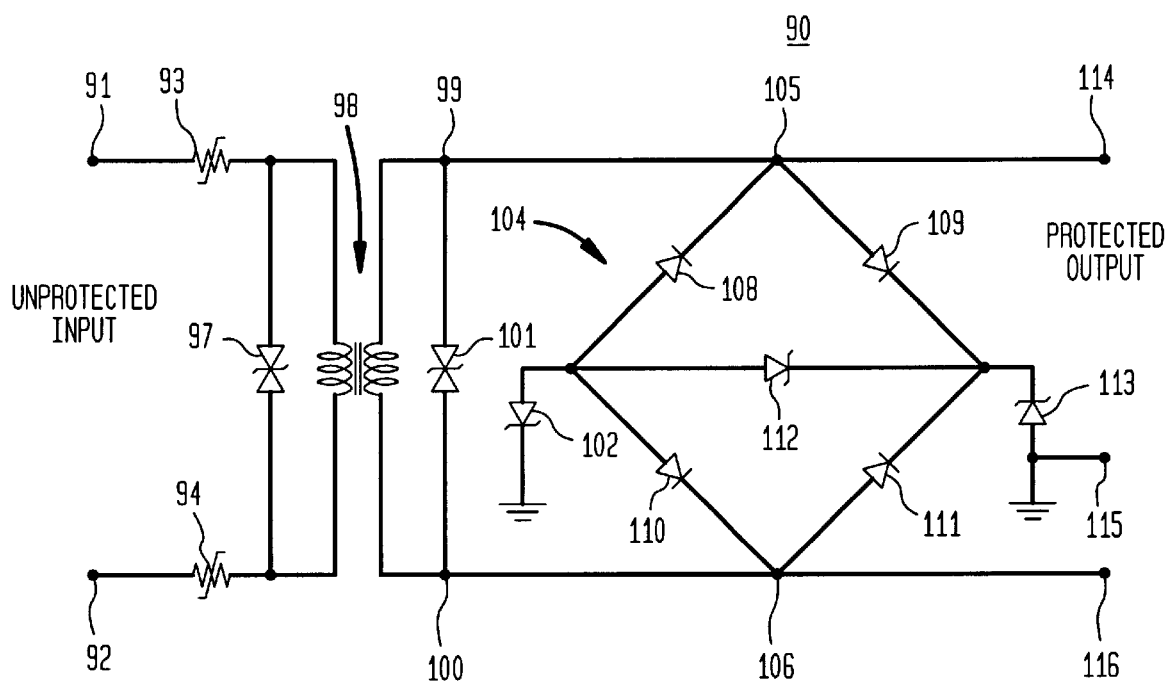
FIG. 4 is a circuit diagram of a secondary protection device, with isolation, in accordance with another embodiment of the present invention.

Still another embodiment of a secondary protection device is shown in FIG. 4 and is generally designated as 90. The circuit to be protected (not shown) is connected between terminals 114 and 116 for receiving T1/E1 signals from input terminals 91 and 92. As previously described, T1/E1 transformer 98 removes the DC bias between the input terminals and output terminals. PTC resistors 93 and 94 and bidirectional zener diode 97 provide similar functions as those having been described for PTC resistors 33 and 34 and zener diode 37, shown in FIG. 2. Zener diode 101 operates similarly to zener diode 41 of FIG. 2; it conducts current differentially between nodes 99 and 100.

Diode bridge 104, which contains fast switching diodes 108, 109, 110, and 111, is shown connected across nodes 105 and 106. Bridge 104 provides a function similar to bridge 67, shown in FIG. 3. Zener diodes 102 and 113, which are respectively connected between bridge 104 and ground node 115, provide functions similar to the functions of diodes 68 and 76, respectively, of FIG. 3. Diodes 101 and 112 are optional and may be omitted.

In each embodiment described above, it has been assumed that the circuit being protected is a 5 volt operating circuit, for example a circuit operating with 5 volt TTL data. For circuits operating at other voltages, for example 12 volt circuits, then 12 volt zener diodes should be used. If another circuit operates with 20 volts, then 20 volt zener diodes should be used. In this manner, secondary protection devices may be made to protect different families of circuits.

Each secondary protection device may be individually packaged in a small module. For example, using solid state construction techniques, an individual secondary protection device may be packaged in a module with the following outline dimensions: 4 cm (1.57")×2 cm (0.79")×1.3 mm (0.5") or any industry standard 5-pin protection block. Furthermore, the individual protection devices may plug into a standard protection punch down block or protection panel. Thus, a system designer may incorporate as many individual secondary protection devices as required. One would simply select appropriate secondary protectors and place them in a punch down block.

What is claimed is:

1. A secondary protection device for protecting a circuit comprising a first positive temperature coefficient (PTC) resistor, a bidirectional zener diode and a second PTC resistor sequentially connected in series across input terminals;

first and second output terminals directly connected across said bidirectional zener diode;

a ground terminal;

a first unidirectional zener diode coupled between the first output terminal and the ground terminal for clamping a positive voltage at the first terminal;

a second unidirectional zener diode coupled between the first output terminal and the ground terminal for clamping a negative voltage at the first terminal; and the first output terminal and ground terminal directly providing a protected output for protecting the circuit, when the circuit is connected directly between the first output terminal and the ground terminal.

2. The secondary protection device of claim 1 wherein said PTC resistors each have a value of 4–6 ohms nominally.

3. The secondary protection device of claim 1 wherein said bidirectional zener diode and said first and second unidirectional zener diodes are each 5 volt zener diodes.

4. The secondary protection device of claim 1 wherein said secondary protection device is modularized and individually inserted in a punch down block for protecting said circuit.

5. The secondary protection device of claim 1 wherein each of said first and second unidirectional zener diodes is one of a 12 volt zener diode and a 20 volt zener diode.

6. The secondary protection device of claim 1 in which the input terminals and the first and second output terminals are each free-of a spark-gap device.

7. A secondary protection device for protecting a circuit comprising a first positive temperature coefficient (PTC) resistor, a diode bridge and a second PTC resistor sequentially connected in series across input terminals;

the diode bridge having first, second, third and fourth nodes, and serially connected first, second, third and fourth diodes; wherein (a) the first diode is connected between the first and second nodes, (b) the second diode is connected between the second and third nodes, (c) the third diode is connected between the third and fourth nodes, (d) and the fourth diode is connected between the fourth and first nodes;

first and second unidirectional zener diodes each connected between said first and third nodes respectively and a ground terminal;

output terminals connected between the second and fourth nodes of said diode bridge for providing a protected output to said circuit;

wherein (a) a positive voltage at the second node generates a current from the second node to the ground terminal directly through the second diode and the second unidirectional zener diode; and (b) a positive voltage at the fourth node generates another current from the fourth node to the ground terminal directly through the third diode and the second unidirectional zener diode; and the input terminals and the output terminals are each free-of a spark-gap device.

8. The secondary protection device of claim 7 wherein said first and second unidirectional zener diodes are each 5 volt zener diodes.

9. The secondary protection device of claim 7 wherein said PTC resistors are each 4–6 ohms nominally.

10. The secondary protection device of claim 7 wherein said secondary protection device is modularized and individually inserted in a punch down block for protecting said circuit.

11. A secondary protection device coupled to a T1 transformer for receiving T1 signals, the secondary protection device comprising a first positive temperature coefficient (PTC) resistor connected between an input terminal and one end of a primary side of said T1 transformer, a second PTC resistor connected between another input terminal and another end of said primary side of said T1 transformer, a first bidirectional zener diode connected across said primary side of said T1 transformer, a second bidirectional zener diode connected across a secondary side of said T1 transformer, and first and second output terminals directly connected across said second bidirectional zener diode;

is a ground terminal;

a first unidirectional zener diode coupled between the first output terminal and the ground terminal for clamping a positive voltage at the first output terminal;

a second unidirectional zener diode coupled between the first output terminal and the ground terminal for clamping a negative voltage at the first output terminal; and the first output terminal and ground terminal directly providing a protected output for protecting the circuit, when the circuit is connected directly between the first output terminal and the ground terminal.

12. The secondary protection device of claim 11 wherein said first and second bidirectional zener diodes and said first and second unidirectional zener diodes are each 5 volt zener diodes.

13. The secondary protection device of claim 11 wherein said first and second bidirectional zener diodes and said first and second unidirectional zener diodes are respectively one of a 12 volt zener diode and a 20 volt zener diode.

14. The secondary protection device of claim 13 in which the input terminals and the first and second output terminals are each free-of a spark-gap device.

15. A secondary protection device coupled to a T1/E1 transformer for receiving T1/E1 signals, the secondary protection device comprising a first positive temperature to efficient (PTC) resistor connected between an input terminal and one end of a primary side of said T1/E1 transformer, a second PTC resistor connected between another input terminal and another end of said primary side of said T1/E1 transformer, a first bidirectional zener diode connected across said primary side of said T1/E1 transformer, a second bidirectional zener diode connected across a secondary side of said T1/E1 transformer, a ground terminal, a diode bridge connected across said secondary side of said is T1/E1 transformer, the diode bridge having first, second, third and fourth nodes, and serially connected first, second, third and fourth diodes wherein (a) the first diode is connected between the first and second nodes, (b) the second diode is connected between the second and third nodes, (c) the third diode is connected between the third and fourth nodes, (d) and the fourth diode is connected between the fourth and first nodes, first and second unidirectional zener diodes each connected between said first and third nodes respectively and a ground terminal;

output terminals connected between the second and fourth nodes of said diode bridge for providing a protected output to said circuit;

wherein (a) a positive voltage at the second node generates a current from the second node to the ground terminal directly through the second diode and the second unidirectional zener diode; and (b) a positive voltage at the fourth node generates another current from the fourth node to the ground terminal directly through the third diode and the second unidirectional zener diode.

16. The secondary protection device of claim 15 in which the input terminals and the output terminals are each free-of a spark-gap device.

* * * * *